Patented Dec. 16, 1930

1,784,949

UNITED STATES PATENT OFFICE

EUGENE BURTON SMITH, OF JACKSONVILLE, FLORIDA, ASSIGNOR TO EDWARD WILSON COLLEDGE, TRUSTEE FOR NATIONAL TURPENTINE PRODUCTS COMPANY, OF JACKSONVILLE, FLORIDA, A CORPORATION OF FLORIDA, AND AMERICAN TURPENTINE & TAR COMPANY, LTD., OF NEW ORLEANS, LOUISIANA, A CORPORATION OF LOUISIANA

PROCESS OF CONVERTING TURPENTINE AND PINE-TAR OILS INTO HEAVIER OILS

No Drawing.  Application filed June 6, 1927. Serial No. 197,001.

This invention relates to a process for converting turpentine and pine tar oils into heavier oils suitable for paint vehicles and similar uses, through the action of certain catalysts on the vapors of the oils.

An object of this invention is to provide oils suitable for paint vehicles and similar uses which will satisfy an active demand and enable manufacturers of turpentine and pine tar oils to dispose of a larger quantity of their products by converting their turpentine and pine tar oils into heavier oils.

Other objects of this invention will appear in the following detailed description of the process.

In carrying out the method or process for converting turpentine and pine tar oils into heavier oils, a still, suitable for heating oils, is connected to a reflux condenser, while another condenser is connected in a suitable manner beyond the reflux condenser in such a manner that it may be adapted for distilling oil by cutting off the water from the reflux condenser and allow the vapors to pass on to the last named condenser.

In operation, the still is charged with oil, the catalyst, preferably fuller's earth, in the form of briquettes or other suitable form, is placed in the path of the vapors between the oil and the reflux condenser and the cooling water is turned on the reflux condenser. The still is then heated sufficiently to cause the oil to boil, but not sufficiently to cause a large amount of vapor to pass beyond the reflux condenser. The vapor passes through or over the catalyst and thence to the reflux condenser. The reflux condenser is so arranged that the condensed oil is returned to the still through or over the catalyst, dissolving and returning any polymerized oil, which may collect on or in the catalyst, to the still. The operation is continued until the polymerization of the oil has reached the desired point. The water is then cut off the reflux condenser and the remaining volatile oils, which have not been acted upon can be distilled off, if desired.

When turpentine is treated in this manner, a product is obtained which has a color and vicosity quite similar to linseed oil. The specific gravity is raised from about .860 to .930 and the product has drying properties suitable for use in paints, varnishes and similar preparations.

When pine tar oil is treated in this manner, the viscosity is raised to that of pine tar and the specific gravity is raised from about 1.030 to 1.060. The resulting product dries well, with a good gloss and is suitable for use as a paint vehicle.

What I claim is:—

The process of converting turpentine and pine tar oils into heavier oils adapted to serve as paint vehicles which consists in vaporizing the oils, passing the vapors in contact with fuller's earth as a catalyst, then condensing the vapors, passing the condensate into contact with the fuller's earth catalyst to dissolve and remove polymerized oil therefrom, and repeating the vaporizing, catalyzing and condensing steps until the polymerized processed product reaches the viscosity and specific gravity adapting it for use as a paint vehicle.

In testimony whereof I affix my signature.

EUGENE BURTON SMITH.